US008350681B2

(12) United States Patent
Bells

(10) Patent No.: US 8,350,681 B2
(45) Date of Patent: Jan. 8, 2013

(54) SYSTEM AND METHOD FOR ESCALATING EVENT ALERTS

(75) Inventor: Matthew Bells, Waterloo (CA)

(73) Assignee: Research In Motion Limited, Waterloo (CA)

( * ) Notice: Subject to any disclaimer, the term of this patent is extended or adjusted under 35 U.S.C. 154(b) by 419 days.

(21) Appl. No.: 12/792,264

(22) Filed: Jun. 2, 2010

(65) Prior Publication Data

US 2011/0298614 A1  Dec. 8, 2011

(51) Int. Cl.
*G08B 1/00* (2006.01)
*G08B 23/00* (2006.01)
*B60Q 1/00* (2006.01)
*H04M 1/725* (2006.01)
*G06Q 10/00* (2012.01)
*H01R 3/00* (2006.01)

(52) U.S. Cl. ............... 340/309.7; 340/500; 340/457; 455/412.1; 439/489

(58) Field of Classification Search .................. None
See application file for complete search history.

(56) References Cited

U.S. PATENT DOCUMENTS

| 2004/0102962 | A1 | 5/2004 | Wei |
| 2006/0129442 | A1 | 6/2006 | Wu |
| 2006/0146068 | A1 | 7/2006 | Jokinen et al. |
| 2006/0218029 | A1 | 9/2006 | Chin |
| 2007/0055770 | A1* | 3/2007 | Karmakar et al. ............ 709/224 |
| 2008/0224883 | A1 | 9/2008 | Mock |
| 2009/0094088 | A1* | 4/2009 | Chen et al. ..................... 705/9 |
| 2009/0276498 | A1* | 11/2009 | Lyle et al. ..................... 709/206 |

FOREIGN PATENT DOCUMENTS

EP  1441300 A1  7/2004

OTHER PUBLICATIONS

Dey, Anind k.; Abowd, Gregory D.; "CybreMinder: A Context-Aware System for Supporting Reminders"; Sep. 27, 2000; retrieved from the internet at http://www.cc.gatech.edu/fce/contexttoolkit/pubs/HUC2000.pdf.
Jarvie, David; "Manuel de Kalarm"; Jul. 21, 2005; retrieved from the internet at http://docs.kde.org/stable/fr/kdepim/kalarm/index.html.
Ferreira, Fernandez; Search Report from corresponding European Application No. 10164758.4; search completed Sep. 30, 2010.

(Continued)

*Primary Examiner* — Jennifer Mehmood
*Assistant Examiner* — Fekadeselassie Girma
(74) *Attorney, Agent, or Firm* — Brett J. Slaney; Blake, Cassels & Graydon LLP

(57) ABSTRACT

An event entry is stored in a computing device, the event entry having a start time associated therewith. A plurality of alerts are provided at respective times prior to the start time, and one of a plurality of levels of notification to be associated with each of the plurality of alerts, wherein the plurality of levels are distinguishable from each other to enable the alerts to be escalated by changing the level associated with each subsequent alert. An initial alert is provided prior to the start time, the initial alert comprising a first level of notification and, upon detecting an increased urgency associated with the event entry subsequent to the initial alert, a next alert is provided prior to the start time, the next alert providing a second level of notification to thereby escalate the next alert with respect to the initial alert.

19 Claims, 12 Drawing Sheets

OTHER PUBLICATIONS

Proxi Marketing; webpage, http://www.proximarketing.com/; accessed online at least as early as Jul. 31, 2009.

POI Loader; webpage, http://www8.garmin.com/products/poiloader/; accessed online at least as early as Jul. 31, 2009; Garmin Ltd.

Speed Trap Sharing System—Trapster; webpage, http://www.trapster.com/; accessed online at least as early as Jul. 31, 2009; Reach Unlimited Corporation.

Voice directions on your GPS phone: TeleNav; webpage, http://www.telenav.com/; accessed online at least as early as Jul. 31, 2009.

SquareLoop—Hot It Works; webpage, http://www.squareloop.com/Hot_It_Works; accessed online Jul. 29, 2009; SquareLoop, Inc.

Nobix—Smartphone Alert; webpage, http://www.nobix.com/SmartphoneAlert.aspx; accessed online Jul. 29, 2009.

MyProfiles Manual; MyProfiles for the iPhone; pp. 1 to 12; published at least as early as Jul. 29, 2010.

"Unwired Express Announces the First Ever Context-Based Enterprise Mobility Platform"; Jun. 13, 2001; Business Wire; accessed Jul. 29, 2009 at http://findarticles.com/.

Singh, Gurminder; Presentation on "Mobile Alerts"; May 2, 2006.

* cited by examiner

SYSTEM AND METHOD FOR ESCALATING EVENT ALERTS

TECHNICAL FIELD

The following relates to systems and methods for controlling event alerts.

BACKGROUND

Computing devices, both mobile and desktop, typically provide applications for organizing events such as meetings or other obligations. For example, a calendar application may be provided to enable a user to organize daily events, including those that require other attendees. When creating a new calendar event, the user is typically able to select or otherwise designate a reminder time. The reminder time generally specifies either a particular time at which the user will be reminded of the event, or an interval of time before the event at which the reminder will occur (e.g. 15 minutes prior).

BRIEF DESCRIPTION OF THE DRAWINGS

Embodiments will now be described by way of example only with reference to the appended drawings wherein.

DETAILED DESCRIPTION OF THE DRAWINGS

It has been recognized that alerts, reminders and other notifications provided prior to an event can be escalated according to a determined increase in urgency for providing a next alert in order to provide various levels of notifications to the user as the urgency increases. A plurality of notification levels can be used to associate a notification level to each of the plurality of alerts such that if an increase in urgency is detected prior to the start time for the event, the next alert can be escalated to provide a notification that is distinguishable from the previous notification to thereby be indicative of the increased urgency.

It has also been recognized that the importance of the event and the urgency of an incoming communication received during the event can be used to control alerts or notifications associated with the incoming communication that are typically provided during the event; by allowing, suppressing, delaying or altering the alert notifications according to the determined importance and urgency.

The following examples include communications between mobile or handheld devices, which will be commonly referred to as mobile devices hereinafter and referred to by numeral 10. As will be discussed, the principles discussed below are equally applicable to other computing devices, such as desktop computers and the like.

The mobile device 10 can be a multi-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a multi-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 1.

Figure 1:
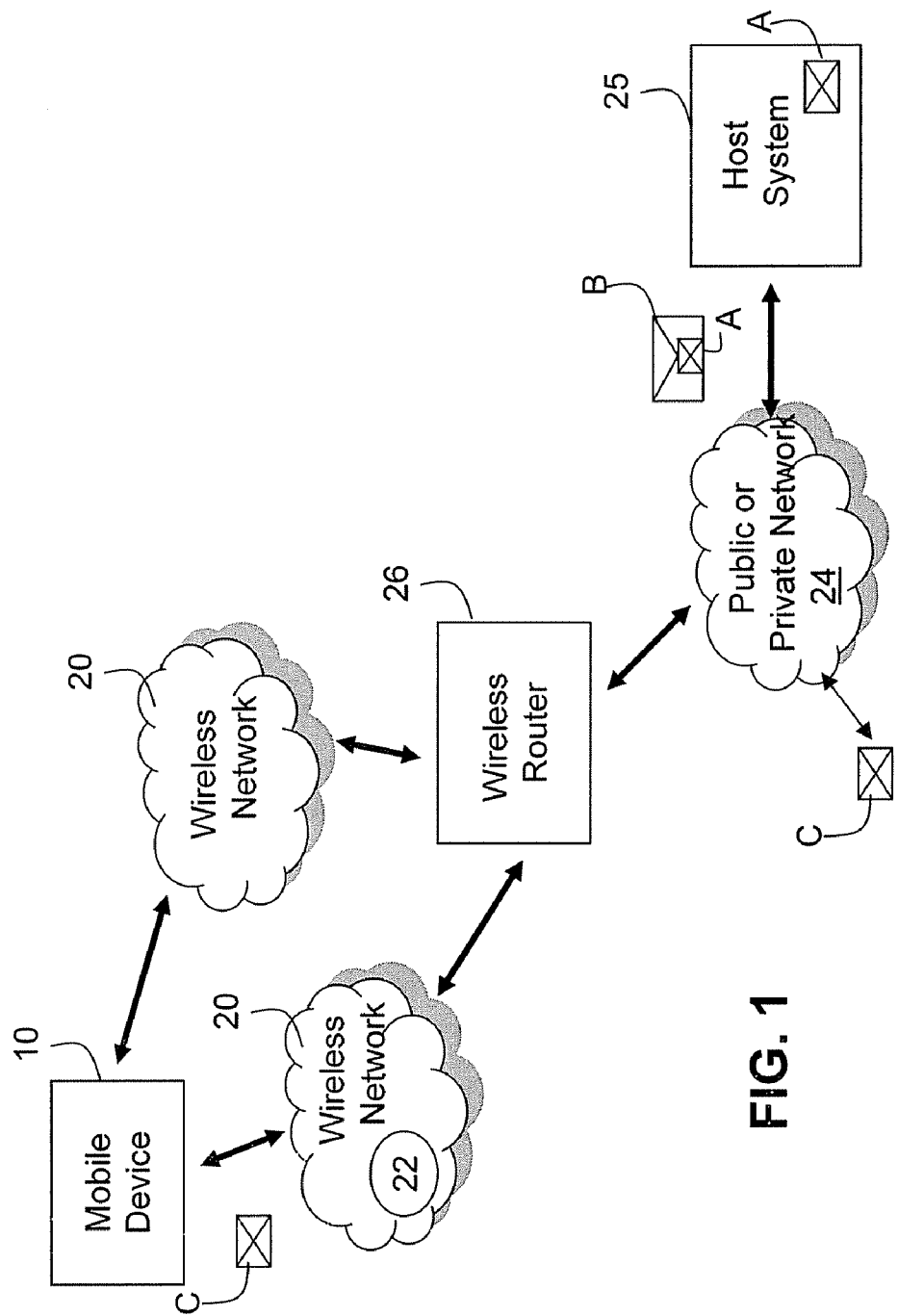
FIG. 1 is a schematic diagram illustrating a system in which data items are pushed from a host system to a mobile device.

FIG. 1 is an example system diagram showing the redirection of user data items (such as message A or C) from an intermediary computer system (host system) 25 to the user's mobile device 10 via a wireless router 26. The wireless router 26 provides the wireless connectivity functionality as it acts to both make transparent most of the wireless network's 20 complexities, and it also implements features necessary to support pushing data to the mobile device 10. Although not shown, a plurality of mobile devices may access data from the host system 25. In this example, message A in FIG. 1 represents an internal message sent from, e.g. a desktop computer (not shown) within the host system 25, to any number of server computers in the network (e.g. LAN), which may, in general, include a database server, an event server, an E-mail server or a voice-mail server.

Message C in FIG. 1 represents an external message from a sender that is not directly connected to the host system 25, such as the user's mobile device 10, some other user's mobile device (not shown), or any user connected to the public or private network 24 (e.g. the Internet). Message C could be e-mail, voice-mail, event information, database updates, web-page updates or could even represent a command message from the user's mobile device 10 to the host system 25. The host system 25 may comprise, along with the typical communication links, hardware and software associated with a computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a network firewall.

The mobile device 10 may be adapted for communication within wireless network 20 via wireless links, as required by each wireless network 20 being used. As an illustrative example of the operation for a wireless router 26 shown in FIG. 1, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a networked environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 2) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a multi-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, events, meeting notifications, address entries, journal entries, personal alerts, alarms, warnings, stock quotes, news bulletins, bank account transactions, field service updates, stock trades, heart-monitoring information, vending machine stock levels, meter reading data. GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 10 traffic can be addressed to a host system 25 without the need for the wireless network 20 to assign an identity to each host system 25; 2) An efficient and authenticated method for the host system 25 to initiate a communication connection to the wireless router 26 for the purposes of opening a communication tunnel to the one or more mobile devices 10 that the host system 25 wishes to communicate with; 3) A reliable method for exchanging data between the host system 25 and the mobile device 10, in a manner consistent with the abilities of the wireless network 20; 4) Providing feedback to the host system 25 when data is delivered, which allows the host system to clean up any wireless delivery queues if necessary, or inform the original sender (user or program) that the data has been delivered to the mobile device 10; 5) Implementation of a wireless network 20 initiated push of services or data to a mobile device 10, from a wireless router 26; and 6) Connect to a wide range of wireless networks 20 and provide a way of tracking the user's location so that a 'follow you anywhere' solution can be provided.

Figure 2:
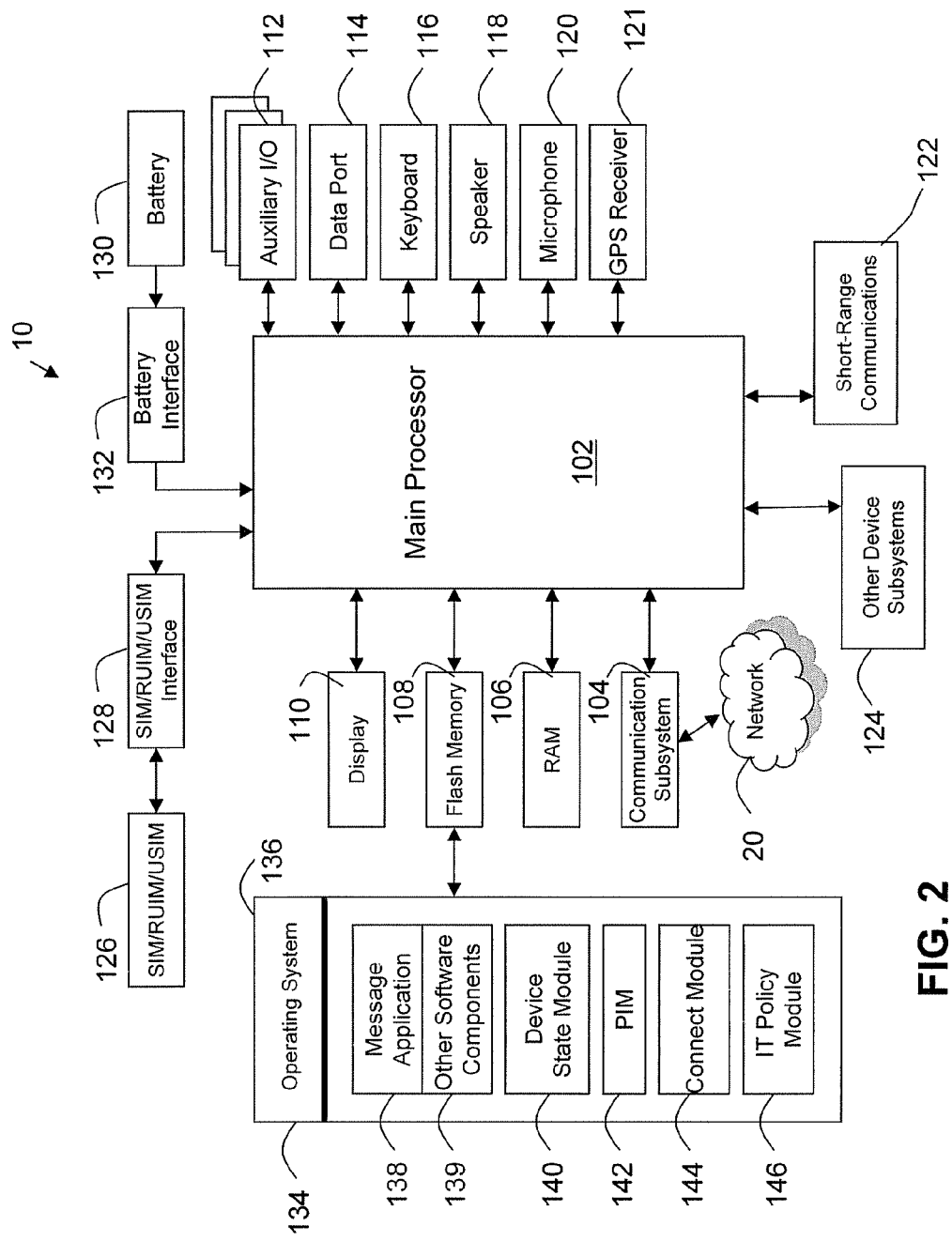
FIG. 2 is a block diagram of an example embodiment of a mobile device.
Figure 3:
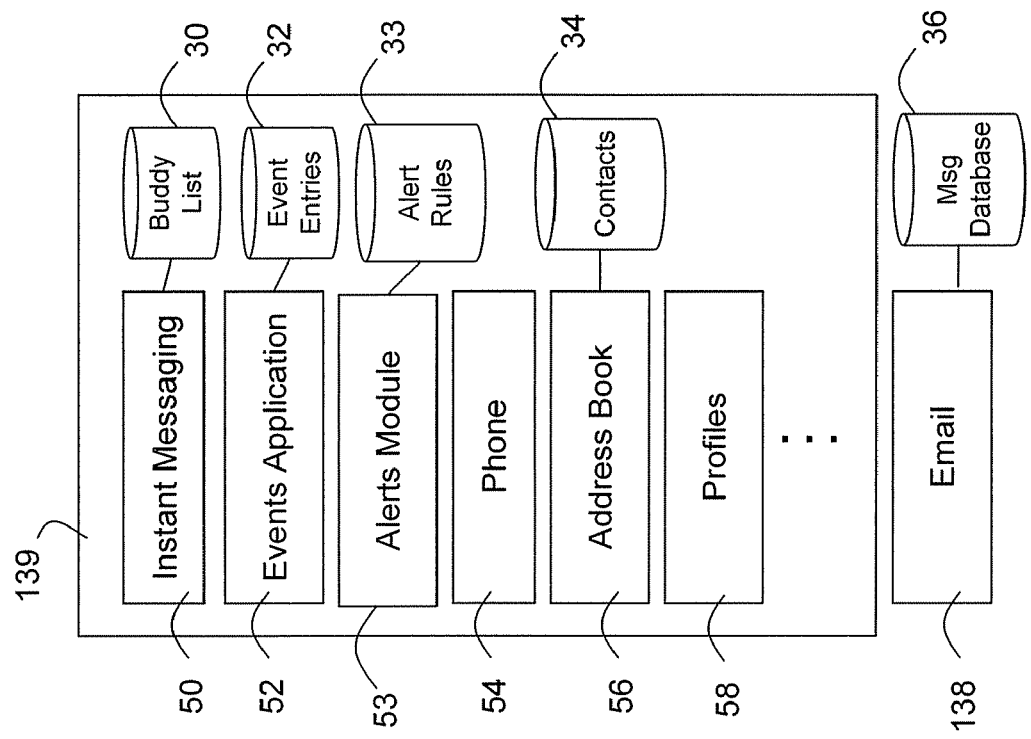
FIG. 3 is a block diagram illustrating example ones of the other software components shown in FIG. 2.

An example configuration for the mobile device 10 is illustrated in FIGS. 2-3. Referring first to FIG. 2, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and controlling data items of interest to the user, such as, but not limited to, e-mail, text messages, instant messages, contacts, events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 3 shows an example of the other software applications and components 139 that may be stored on and used with the mobile device 10. Only examples are shown in FIG. 3 and such examples are not to be considered exhaustive. In this example, an instant messaging application 50, events application 52, an alerts module 53, phone application 54, address book 56 and a profiles application 58 are shown to illustrate the various features that may be provided by the mobile device 10. It may be noted that the alerts module 53 is shown as a separate component for illustrative purposes only and may instead be part of or otherwise a subset of the events application 52. Also shown in FIG. 3 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The instant messaging application 50 is an instant messaging service that may hosted and provided by the host system 25, e.g. using a messaging server at the wireless router 26 or may be associated with a $3^{rd}$ party instant messaging service (not shown). The instant messaging application 50 comprises or otherwise has access to contact information often referred to as a "buddy" list 30. The events application 52 comprises or otherwise has access to a portion of memory, database or other data storage device storing event entries 32 which may include any data or information associated with a particular date and time in the events application 52 and may be displayed in a graphical user interface (GUI) therefor.

The alerts module 53 comprises or otherwise has access to a set of alert rules 33, which may be stored in memory such as a database. The alert rules 33 in the examples described herein may generally refer to any data or information that is used or referred to by the alerts module 53 in performing its operations and may be updatable, e.g. through user profiles or preferences, user input, IT policies, external commands (i.e. from other devices), etc. In the examples provided below, the alert rules 33 may relate to rules associated with the escalation of alerts prior to an event start time, rules associated with controlling the delivery of alerts during a particular event according to the importance of the event and the urgency of an incoming communication triggering the alert, or both.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, wireless router 26, host system 25, etc., or accessible or connectable thereto. Any application or module herein described may be implemented using computer readable/ executable instructions that may be stored or otherwise held by such computer readable media.

Figure 4:
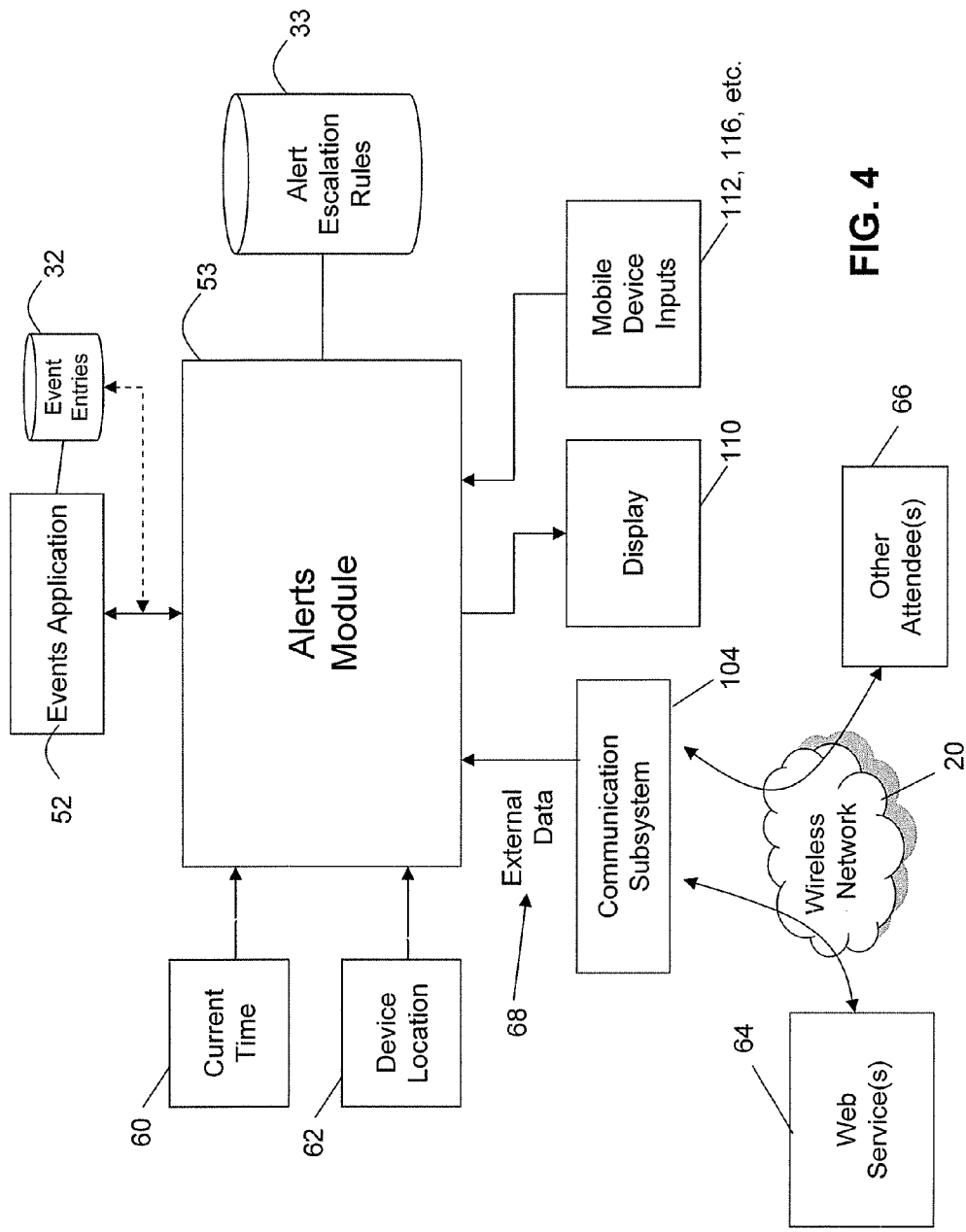
FIG. 4 is a block diagram illustrating an example configuration for the alerts module shown in FIG. 3.

Turning now to FIG. 4, an example configuration for the alerts module 53 is shown. The alerts module 53 interacts with the events application 52 in order to determine and provide alerts, reminders, or notifications (collectively referred to as "alerts" hereinafter) associated with event entries 32. The alerts may be associated with reminders or other notifications prior to a particular event, notifications pertaining to incoming communications or other circumstances detected during the particular event, or both. As discussed above, the alerts module 53 is used to determine whether or not to escalate alerts prior to an event and/or how to control alerts associated with incoming communications during an event. Such determinations are performed according to a predefined routine, algorithm, set of criteria, mathematical relationship, etc.; and can be based on the importance of the event, the urgency of the incoming communication (if applicable), or both. When escalating alerts, the alerts module 53 relies on the current time 60 in order to determine temporal urgency with respect to the event start time. The alerts module 53 may also rely on a device location 62, e.g. determined using the GPS receiver 121, when the device's location is indicative of a need to increase the urgency of an alert such as a reminder. For example, if the device location 62 indicates that the user is currently located farther from the event's location than is recommended at a particular time prior to the event (e.g. in order to reach the event or be able to connect to a teleconference for the event), an escalation of the alert may be warranted.

The alerts module 53 relies on the alert rules 33 in order to determine whether or not any given temporal or location based data, as well as any external data 68 obtained from another entity, is indicative of an escalation of an alert prior to an event, or whether or not an alert should be allowed, suppressed, delayed or altered during an event.

The external data may be obtained from one or more external web services 66 via the wireless network 20 and the communication subsystem 104 as shown. The web services 64 may be polled periodically, external data 68 may be uploaded to the mobile device 10 or downloaded from the web service 64 at predetermined times, or external data 68 may be requested by or for the alerts module 53 in performing an alert or reminder algorithm. The web services 64 may be publicly available sources, e.g. available via a web page, or may be dedicated or custom services, e.g. provided in conjunction with the wireless router 26 or host system 25. As can be seen in FIG. 4, the communication subsystem 104 enables the events application 52 and the event entries 32 to be shared with other attendees 66 where applicable.

For displaying messages and/or reminders on the mobile device 10, the alerts module 53 may utilize the display 110 and receive inputs from the mobile device inputs such as the auxiliary I/O 112, keyboard 116, etc. to obtain instructions for performing further operations pertaining to the event, e.g. to snooze or dismiss a reminder notification displayed or otherwise provided to the user prior to the event.

In order to intelligently control alerts associated with particular events in this example, one or more event entries 32 exists. A event entry 32 may be entered in response to a meeting or other event request (from a meeting organizer) or may be entered locally by the user, e.g. into a calendar or organizer application. In the following examples, an event entry 32 is generated in the events application 52 to enable settings associated with the alerts module 53 and thus the alert rules 33 to be specified.

Figure 5:
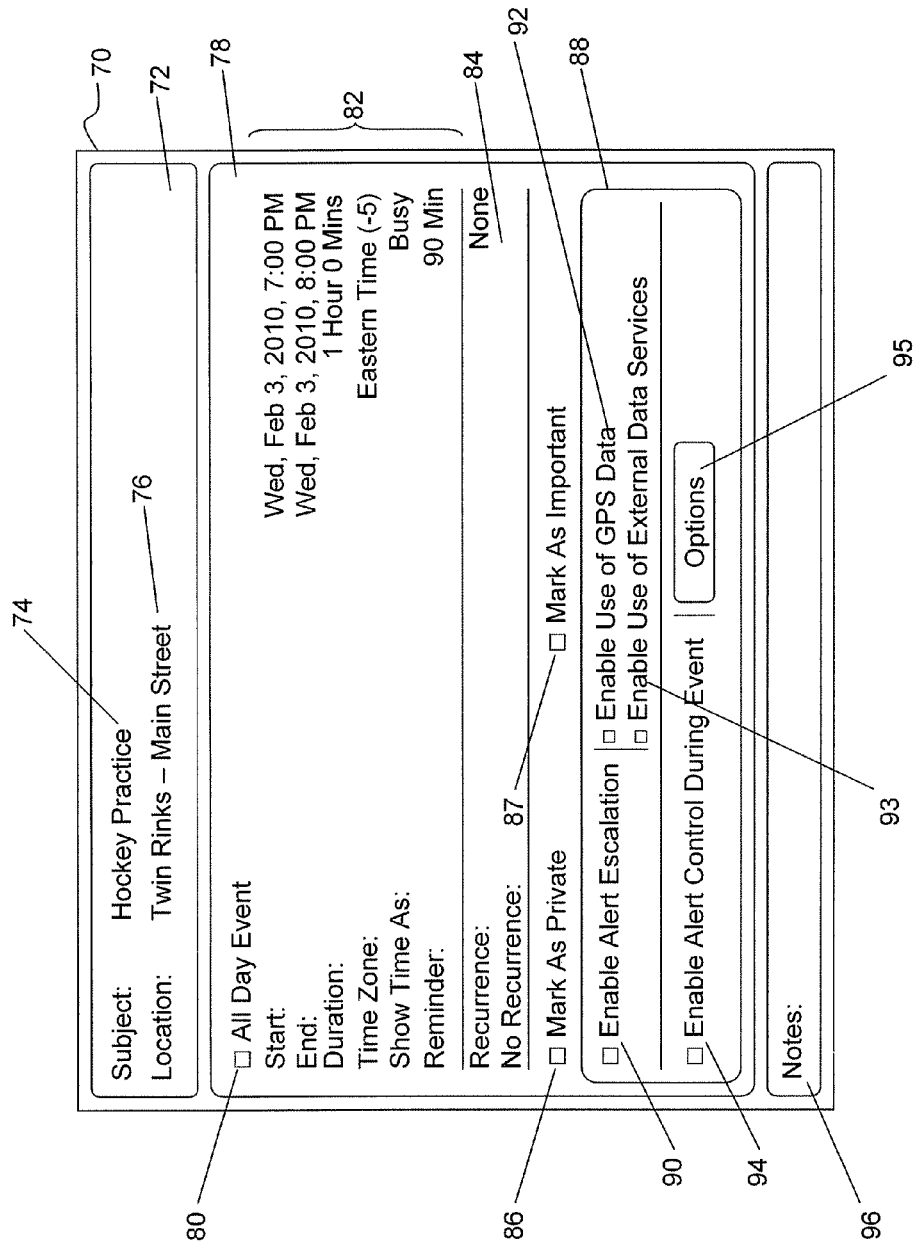
FIG. 5 is a screen shot of an example graphical user interface (GUI) for an event entry interface.

The events application 52 may be initiated or otherwise accessed or launched by, for example, selecting a corresponding icon (not shown) displayed on the mobile device 10 as is well known in the art. Within a typical events application 52, new events, also known as appointments can be entered into a user's organizer or event related application in various ways. For example, the user may select a block of time within a day, week or month view and begin entering text associated with the event or appointment to create a new entry. Alternatively, as shown in FIG. 5, a user interface (UI) providing a new entry screen 70 can be used to specify details and features of the event or appointment. Such a new entry screen 70 can be accessed through a menu (not shown) or other appropriate input mechanism. For simplicity, any event or appointment or other block of time associated with an occurrence in the events application 52 will be referred to as an "event".

In the example shown in FIG. 5, the new entry screen 70 comprises a heading portion 72, a details portion 82, and a notes portion 96. The heading portion 72 enables a subject 74 and a location 76 for the event to be specified, wherein typically the subject 74 is used to identify the event in the calendar display in a short-hand manner. The notes portion 96 enables additional information to be added to the event entry, for example agenda items or other information pertinent to the corresponding event.

The details portion 82 provides the ability to specify various parameters 78 for the event. In the example shown, the parameters include a start time, an end time, a duration, a time zone, how to display the user's availability during that time (Show Time As), and when to provide a reminder (if any). It can be appreciated that such parameters may be interrelated and a setting in one or more of the parameters can thus cause another parameter to change. For example, the end time with respect to the start time should automatically adjust the duration accordingly. Rather than specify specific times for the appointment, an All Day Event option 80 can also be provided to enable the event to span the entire day in the organizer. An event can also be a recurring event and thus recurrence settings 84 can also be specified in this example. In FIG. 5, there is no recurrence of the event. However, although not shown in FIG. 5, the event can be set to be a recurring event, e.g. daily, weekly, monthly, etc. which then enables the user to enter appropriate settings for the recurring event, such as the end date for the event (or never), which day (when weekly or monthly), etc. as is well known in the art.

In order to control the event's visibility to other attendees in a shared events application 52, a Mark As Private option 86 can also be provided. In this way, by selecting the Mark As Private option 166, the user can control read permissions across a group sharing their events applications 52. For example, if a user that normally shares their events application 52 has a private meeting, e.g. a job interview that they do not wish to divulge, they can use the Mark as Private option 86 to ensure that the other members of the group know that they are busy but do not know the details.

In order to associate a relative importance with the event, a Mark As Important option 87 can be selected. In this example, the event may be designated as important (by selecting option 87) or not (by not selecting or de-selecting option 87), however, it can be appreciated that any plurality of importance levels can be used (e.g. 1, 2, 3 or low, medium, high, etc.). As will be explained in greater detail below, associating a relative importance with the event can facilitate the alerts module 53 in determining whether or not to escalate an alert before the event or to control alerts during the event.

To enable the user to have some control over the alerts module 53 and the alert rules 33, the details portion 78 may also include an alert options portion 88 as shown in FIG. 5. The alert options portion 88 in this example includes an Enable Alert Escalation option 90 which allows the user to select or deselect use of the alerts module 53 prior to an event. It can be appreciated that in some embodiments, the Enable Alert Escalation option 90 can be linked to the Mark As Important option 87 such that the Enable Alert Escalation option 90 can only be used if the Mark As Important option 87 has been selected. Alternatively, selection of the Enable Alert Escalation option 90 can be an implicit selection of the Mark As Important option 87 and thus the Mark As Important option 87 does not necessarily need to be provided as an explicit selection. When the Enable Alert Escalation option 90 is selected, the user is able to select an Enable Use of GPS Data option 92 and/or an Enable Use of External Data Services option 93. When the Enable Use of GPS Data option 92 is selected, the mobile device 10 is configured to utilize the GPS receiver 121 to determine the mobile device's location in order to enable the alerts module 53 to incorporate a device location 62 into its alert escalation algorithm. The Enable Use of External Data Services option 93 enables the alerts module 53 to rely on one or more third party services, e.g. web services 64, to obtain external data 68 for use in determining whether or not to escalate an alert prior to an event. The ability to select or de-select options 92 and 93 allows the user to control the use of services that may affect bandwidth, battery power, or have a cost associated with them (e.g. according to a data plan, subscription service, etc.).

Figure 14:
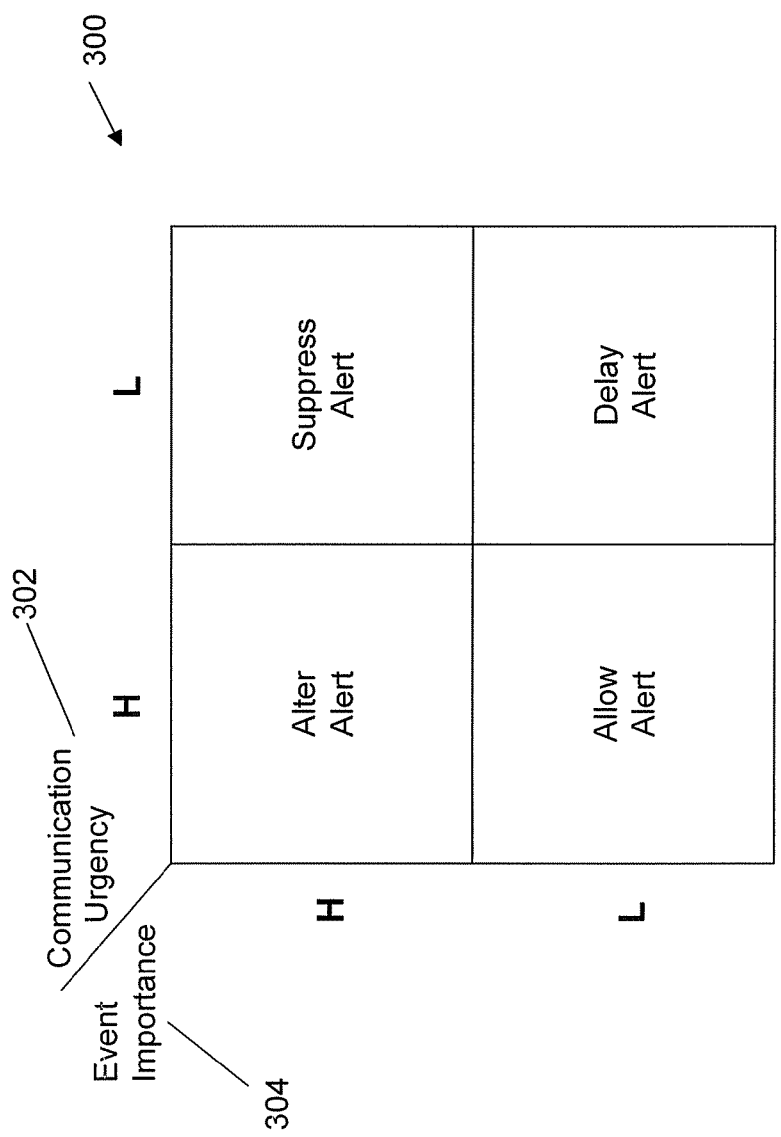
FIG. 14 is an example decision matrix for determining whether to allow, suppress, delay or alter an alert.

The alert options portion 88 in this example also comprises an Enable Alert Control During Event option 94. By selecting the Enable Alert Control During Event option 94, the alerts module 53 is configured to access and comply with alert rules 33 that enable the alerts module 53 to determine whether or not to allow, suppress, delay or modify an alert during an event. It can be appreciated that, in some embodiments, the Enable Alert Control During Event option 94 can also be linked to the Mark As Important option 87 such that the Enable Alert Control During Event option 94 can only be used if the Mark As Important option 87 has been selected. Alternatively, selection of the Enable Alert Control During Event option 94 can be an implicit selection of the Mark As Important option 87 and thus the Mark As Important option 87 does not necessarily need to be provided as an explicit selection. As discussed above, the alert rules 33 can be modified, for example, using user-definable profiles or preferences (not shown). In order to select and modify such settings, an options button 95 is provided which, when selected, can initiate and display an interactive user interface (not shown) such as a pop-up window with selectable options or a completely separate, interactive screen. Alternatively, the Enable Alert Control During Event option 94 can be configured to include a fixed set of alert rules 33, e.g. according to a decision matrix 300 as shown in FIG. 14.

It can be appreciated that the alert options 92-95 are provided for illustrative purposes only and various combinations of these features can be provided using any suitable user interface, IT policy, using predefined alert rules 33, etc.

Figure 6:
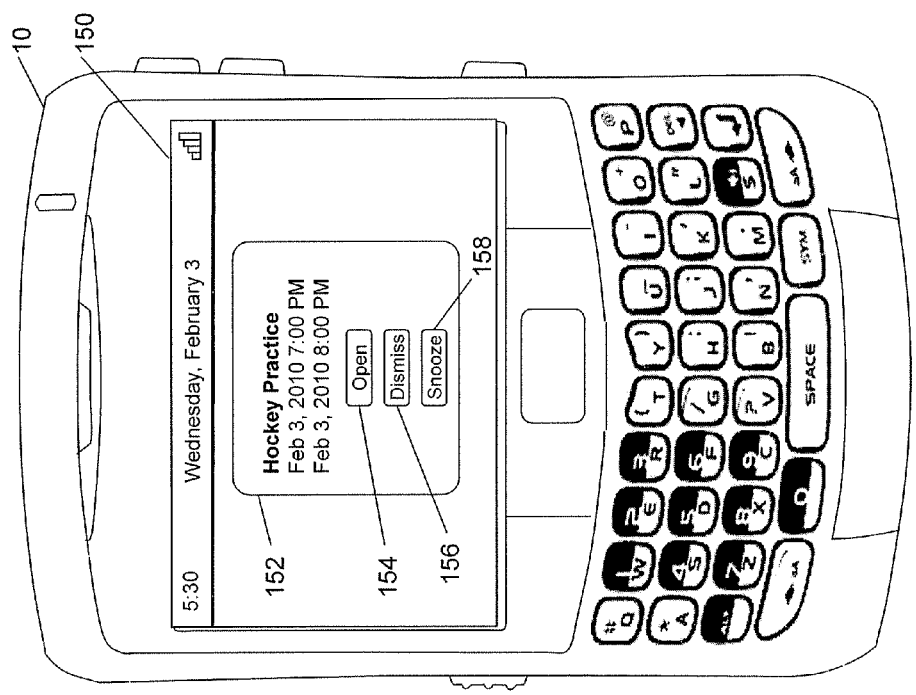
FIG. 6 is an example exterior view of a mobile device displaying an alert.

Turning now to FIG. 6, an exterior view of a mobile device 10 is shown, wherein the mobile device 10 is currently displaying an event reminder 152 corresponding to the Hockey Practice event shown in FIG. 5. Since the reminder for this event has been set to activate 90 minutes prior to the event, and the event has a start time of 7:00 PM, the event reminder 152 in this example is displayed at 5:30 PM on the same day as the event. The event reminder 152 comprises three option buttons, an Open button 154, a Dismiss button 156, and a Snooze button 158. By selecting the Open button 154, event details are displayed and can be modified if desired. By selecting the Dismiss button 156, the reminder is effectively acknowledged and no further event reminders 152 are displayed for that event. By selecting the Snooze button 158, the event reminder 152 is configured to be re-displayed at some later time. Although not shown in FIG. 6, by selecting the Snooze button 158 another option may be displayed which enables the user to select or specify a desired time at which the event reminder 152 will be re-displayed. In this example, it is assumed that the Snooze button 158 is selected and the next event reminder 152 is either pre-set or specified by the user at that time to be re-displayed in 30 minutes as shown in FIG. 7.

Figure 7:
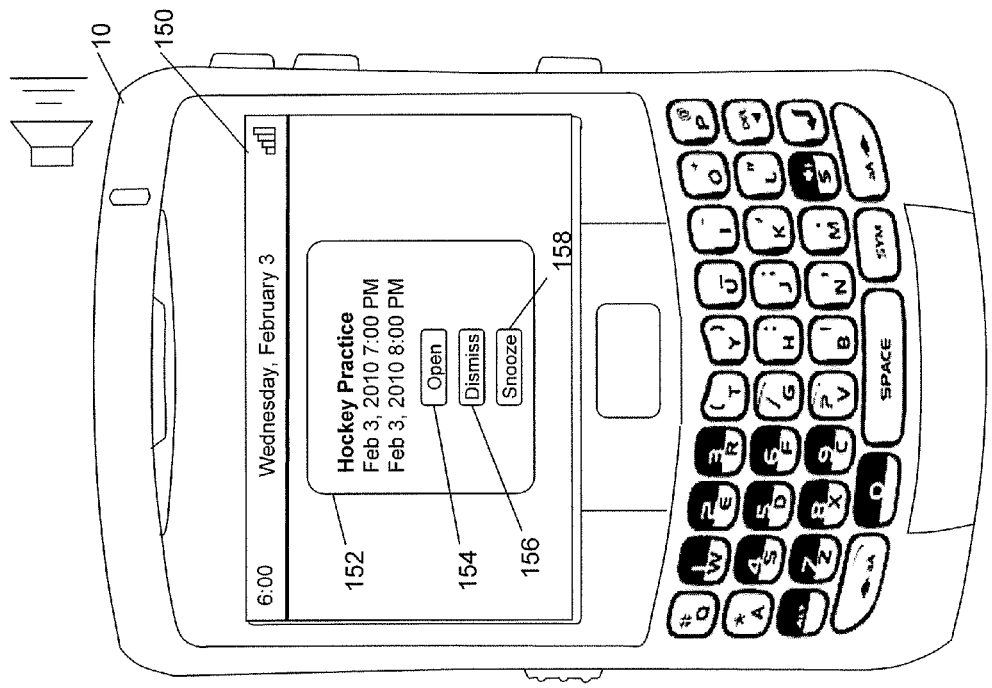
FIG. 7 is an example exterior view of a mobile device displaying an alert comprising an audible notification.

The event reminder 152 is, in this example, re-displayed at 6:00 PM as shown in FIG. 7. As will be explained in greater detail below, prior to re-displaying the event reminder 152, the alerts module 53 has determined that the alert associated with the Hockey Practice event should be escalated and, as shown pictorially in FIG. 7, an audible alert accompanies the re-displayed event reminder 152 to signify a further level of urgency. The alerts module 53 can use various criteria for determining whether or not to escalate an alert. For example, in this example, the user selecting the Snooze button 158 triggers an escalation for the next alert since use of the Snooze button 158 can be indicative of the user's interest in being reminded again. In other examples, the proximity of the current time 60 to the event start time, the device location 62 when compared to the event location, external data 68, or any combination thereof, can factor into the triggering of an escalation for the next alert and the nature of such escalation.

Figure 8:
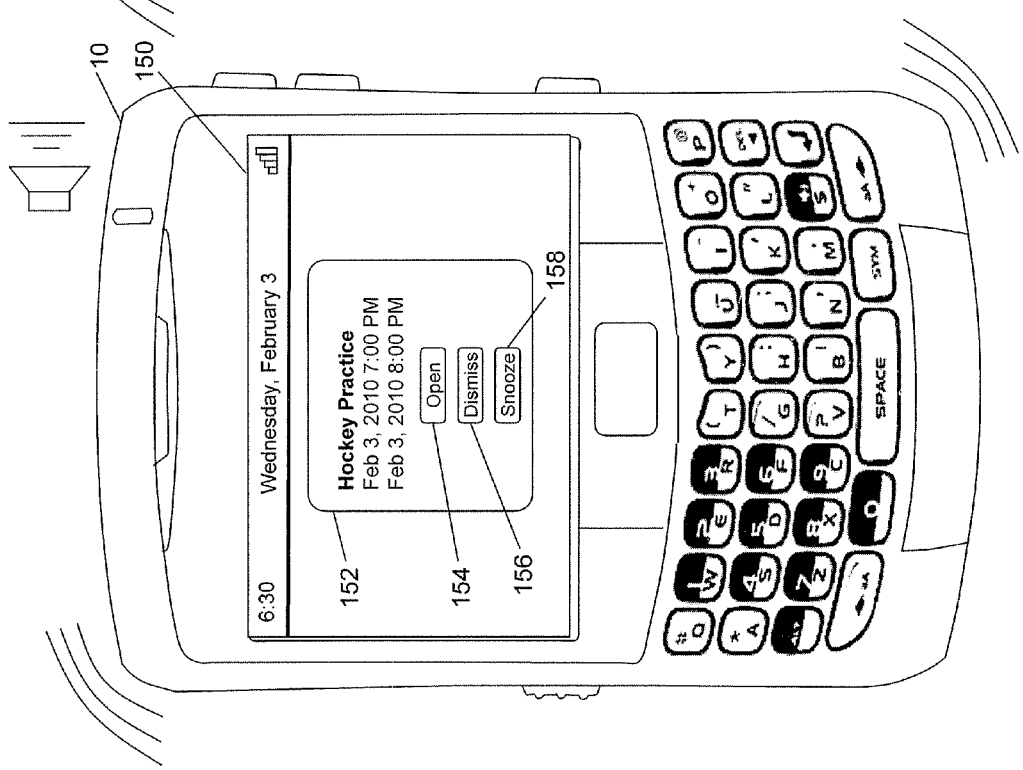
FIG. 8 is an example exterior view of a mobile device displaying an alert comprising an audible notification and a vibration notification.

FIG. 8 illustrates yet another event reminder 152 being displayed subsequent to the "next alert" displayed in FIG. 7, in this example, at 6:30 PM. It is assumed in this example that the user selected the Snooze button 158 when the reminder was re-displayed in FIG. 7. Prior to re-displaying the event reminder 152 yet again as shown in FIG. 8, the alerts module 53 in this example has determined that a further escalation of the alert is warranted. Consequently, as can be seen in FIG. 8, both an audible notification and vibration of the mobile device 10 are used, wherein the vibration or "movement" of the mobile device 10 is indicated pictorially by the movement lines at opposite corners. In this way, as the current time 60 becomes closer and closer to the event start time, and the Snooze button 158 continually utilized, the alerts module 53 progressively escalates the alert (e.g. by combining the visual event reminder 152 with the audible notification and vibration) to provide distinguishable cues to the user as to the increasing urgency of the approaching event. By selecting the Dismiss button 156, and effectively acknowledging the event reminder 152, the alerts module 53 can be configured to no longer escalate the alerts.

Figure 9:
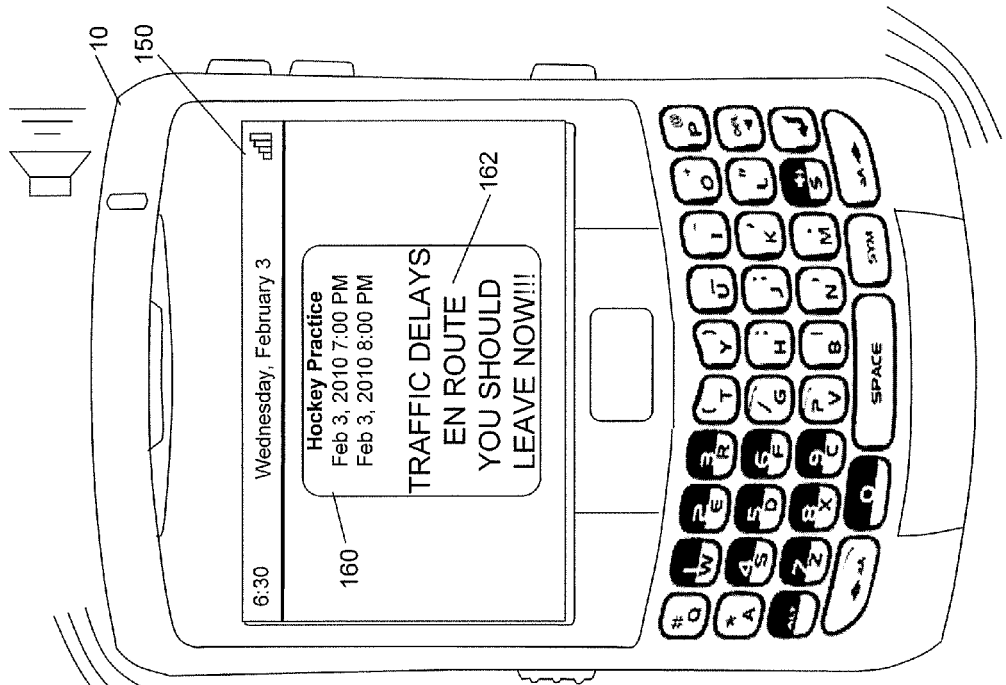
FIG. 9 is an example exterior view of a mobile device displaying an alert comprising an audible notification and a vibration notification, the alert being triggered by receipt of external data.

In other circumstances, such as those wherein the mobile device 10 is configured to obtain external data 68, e.g. traffic or weather data, alerts that are separate from the reminder time associated with the event, may escalate over time according to the nature of the external data 68 received. FIG. 9 illustrates an alternative scenario to that shown in FIG. 8, wherein the user has dismissed the event reminder 152 after the second reminder in FIG. 7, but the external data 68 indicates that there are potential traffic delays en route between the device location 62 and the event location. In this scenario, although the user appears to have acknowledged the increased urgency of the approaching event in FIG. 7, subsequent factors have caused the alerts module 53 to determine that a further escalation of the alert is warranted. As shown in FIG. 9, an external events reminder 160 may resemble a normal event reminder 152 but may include details 162 explaining the reason for the alert, i.e. "TRAFFIC DELAYS EN ROUTE YOU SHOULD LEAVE NOW!!!" in this example.

It can be appreciated that the escalation of an alert associated with the event can be performed according to any data available to the alerts module 53 using one or more algorithms or routines that, for example, are stored in the alert rules database 33 and are made available to the alerts module 53. The alerts module 53 is configured to enable a plurality of alerts to be provided at respective times prior to the start time, and to enable one of a plurality of levels of notification to be associated with each of the plurality of alerts, wherein the plurality of levels are distinguishable from each other to enable the alerts to be escalated by changing the level associated with each subsequent alert. The alerts module 53 is also configured to provide an initial alert prior to the start time, the initial alert comprising a first level of notification, and to detect an increased urgency associated with the event entry subsequent to the initial alert. The alerts module 53 then provides a next alert prior to the start time, the next alert providing a second level of notification to thereby escalate the next alert with respect to the initial alert.

In the example shown in FIGS. 6 to 9, three alert levels are shown, a first alert level comprising a visual cue, a second alert level comprising the visual cue and an audible cue, and a third alert level comprising the visual cue, the audible cue, and a tactile (physical) I cue that results in a movement of the mobile device 10 (e.g. a vibration). These alert levels are only illustrative and various other combinations can be used. For example, a plurality of progressively longer and/or louder audible alerts, a plurality of progressively longer and/or louder tactile alerts (e.g. with an associated buzzing sound), a plurality of progressively larger visual cues, a plurality of differently coloured visual cues (e.g. green, yellow, red), or any combination thereof, would be suitable according to the principles discussed herein.

Figure 10:
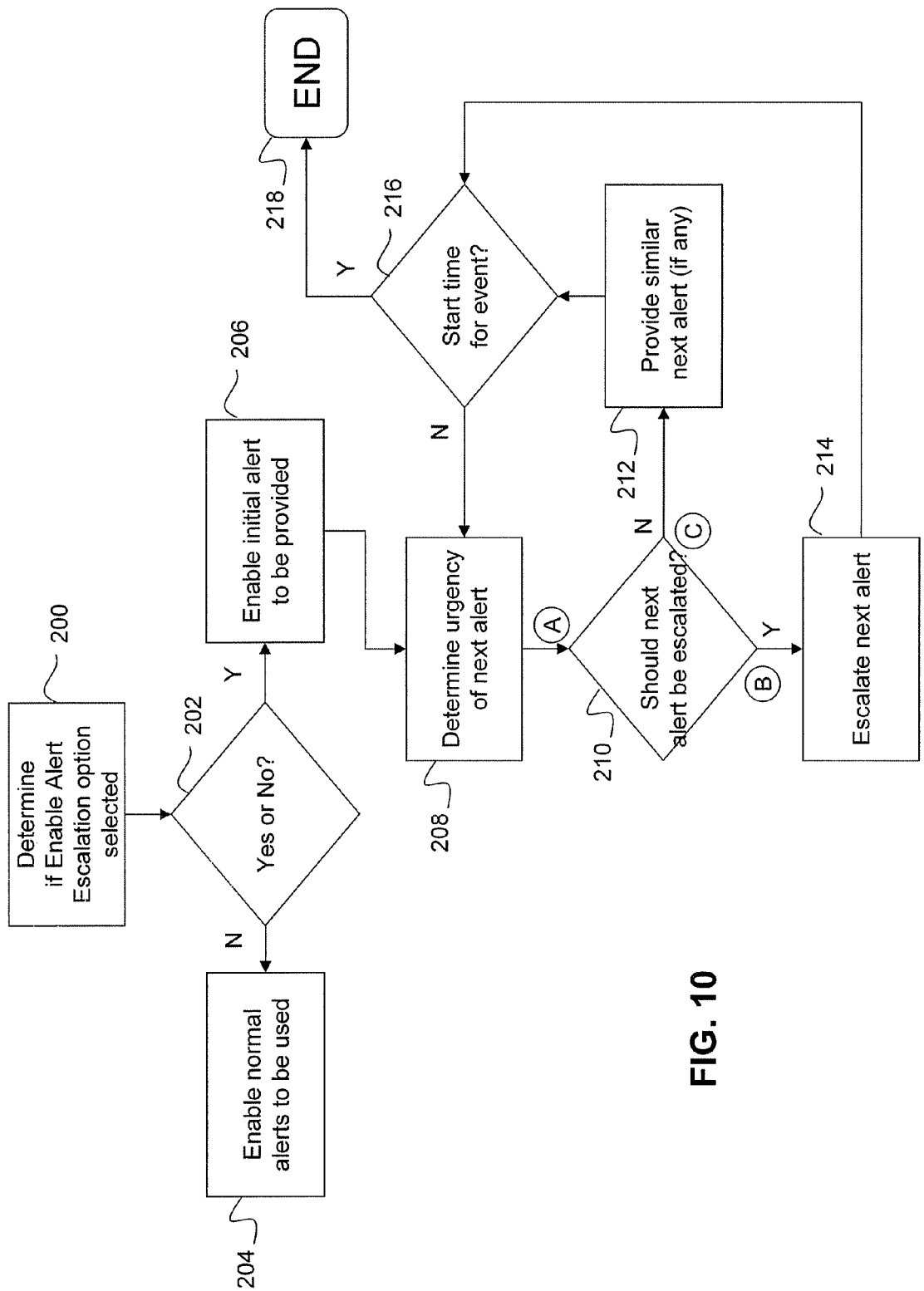
FIG. 10 is a flow chart comprising an example set of computer executable instructions for escalating an alert associated with a particular event prior to the event.

FIG. 10 illustrates an example set of computer executable instructions that are executed by the alerts module 53 in order to determine whether or not to escalate an alert. At 200, the alerts module determines if the Enable Alert Escalation option 90 has been selected. If it is determined at 202 that the Enable Alert Escalation option 90 has not been selected, the normal alerts are used at 204, i.e. the user may be reminded using the event reminder 152 but no escalation is utilized. If it is determined at 202 that the Enable Alert Escalation option 90 has been selected, the alerts module 53 may then allow an initial alert to be provided at 206. In the examples discussed above, this can include enabling the first event reminder 152 to be displayed at the designated time. As can be appreciated, in other embodiments, the initial alert may comprise various notifications (audible, visual, tactile) and may be provided at various times (user specified, default, IT policy, etc.) and should not be limited to event reminders 152.

Subsequent to the initial alert being provided at 206, the alerts module 53 determines the urgency of providing a next alert at 208 in order to determine 210 whether or not the next alert should be escalated. If at 210 it is determined that the next alert should not be escalated, no escalation is applied and thus a similar next alert (if any—e.g. dependent on the use of the Snooze button 158) is provided at 212. If it is determined at 210 that the next alert should be escalated, the next alert is escalated at 214. Following the next alert (if any), the alerts module 53 determines at 216 if the start time for the event has arrived. If not, operation 208 may be repeated to determine if escalation is warranted for another next alert (if any). If the event time has arrived, the process ends at 218.

Figure 11:
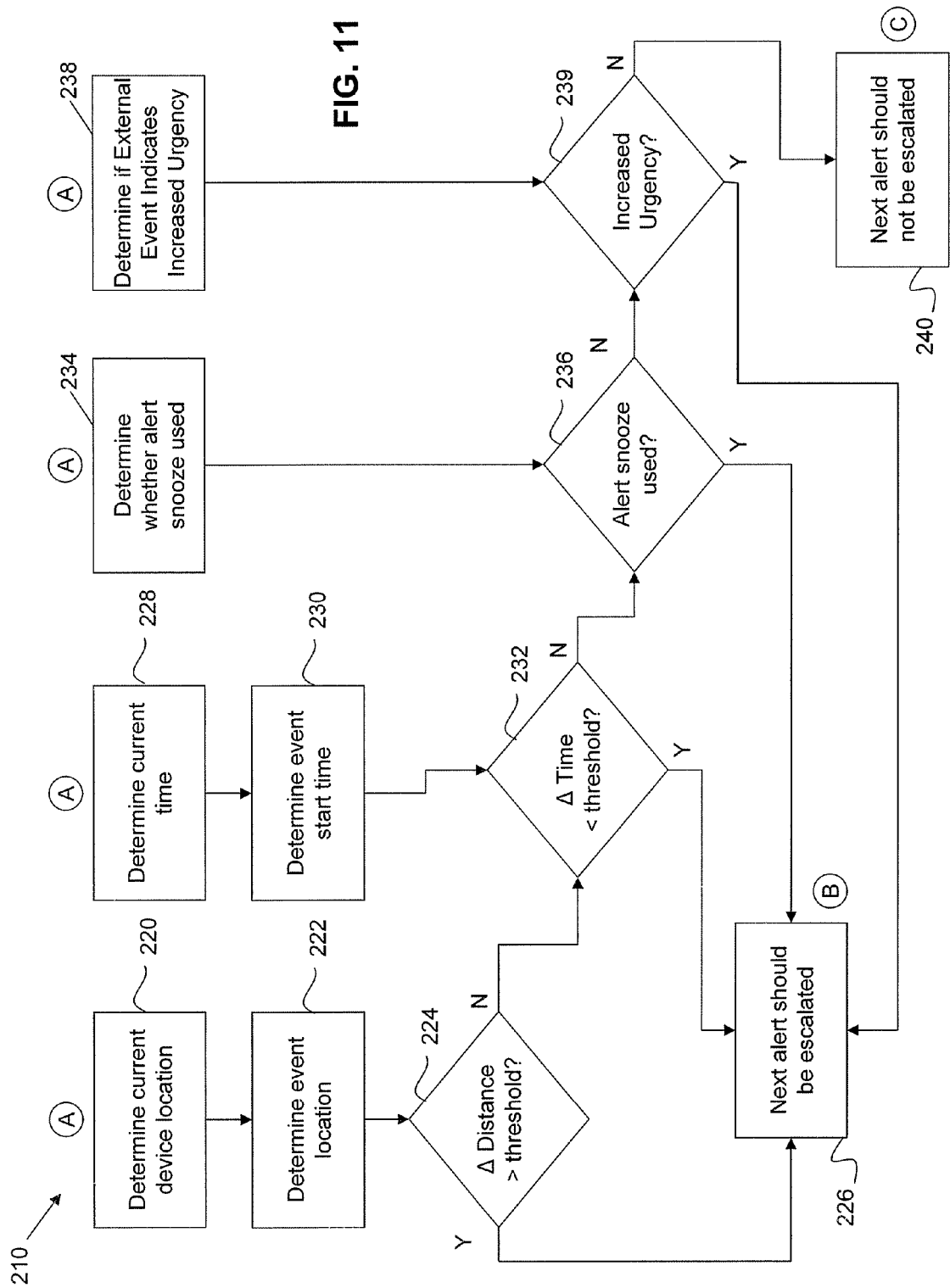
FIG. 11 is a flow chart comprising an example set of computer executable instructions for determining whether or not the urgency of an alert associated with an event has increased.

As indicated by letters A, B, and C, at 210, a sub-routine is initiated by the alerts module 53 to determine whether (B) or not (C) the next alert should be escalated. FIG. 11 illustrates an example set of computer executable instructions that may be executed by the alerts module 53 in order to make such a determination. In the example shown in FIG. 11, four different criteria are relied upon in order to arrive at either outcome B or outcome C and thus proceed accordingly in FIG. 10. It can be appreciated that any one or more of these criteria in any combination may be utilized and other criteria can also be relied upon. The four criteria are evaluated in this example such that if any one has been met, the next alert is escalated. However, these criteria can instead be evaluated serially such that any two or even all four need to be met in the same evaluation, in order to escalate the next alert.

In this example, the alerts module 53 determines the current device location 62 at 220, and determines the event location at 222, wherein the urgency of the alert is increased if the distance between the device location and the event location is greater than a predetermined threshold. For example, these location measurements can then be used to determine the mobile device's estimated distance from the event (denoted by Δ Distance in FIG. 11) and this estimated distance compared to a threshold at 224. The threshold can be derived empirically, according to user input, or using other factors. For example an accelerometer or the GPS receiver 121 can be used to detect whether or not the mobile device 10 is travelling to the event in a vehicle or by foot and modify the threshold accordingly. Instead, the user can enter a desired threshold, e.g. via the event entry screen 70. If Δ Distance is greater than the threshold, i.e. if the user appears to be outside of a comfortable range, the alerts module 53 may determine that it is appropriate to escalate the next alert at 226. If Δ Distance is less than the threshold, the alerts module 53 may proceed to a parallel determination to determine if the next alert should or should not be escalated. It can be appreciated that although the "N" branch at 224 proceeds to the next determination (at 232), it could instead proceed to the beginning of the next criterion at 228. Also, an "N" at branch 224 could also cause the alerts module 53 to proceed directly to outcome C, i.e. wherein the alert is not escalated.

The alerts module 53 may also determine the current time 60 at 228 and the event start time at 230, wherein the urgency is increased if the time remaining until the start time is less than a predetermined threshold. For example, these time values can be used to determine an estimated time until the event (denoted by Δ Time in FIG. 11) and this estimated time compared to another threshold at 232. As with the distance threshold, the time threshold can be derived empirically, according to user input, or using other factors. It may be noted that Δ Time may be an existing value that is normally computed by the events application 52 for the purpose of determining when to trigger the event reminder 152 (or at what time to re-display the event reminder 152) and thus the sub-routine in FIG. 11 may be linked to or share data with other routines employed by the mobile device 10. If Δ Time is less than the threshold, i.e. if the current time is sufficiently "close" to the event start time, the alerts module 53 may determine that it is appropriate to escalate the next alert at 226. For example, Δ Time may be used to trigger the re-displaying of the event reminder 152 in the normal fashion (e.g. according to whether or not the Snooze button 158 has been selected) until Δ Time falls below the threshold, at which time the next alert is escalated rather than only re-displayed again. If Δ Time is greater than the threshold, the alerts module 53 may then proceed to the next parallel determination being made at 236.

The alerts module 53 may also determine whether the Snooze button 158 was used for a previous alert at 234, wherein the increased urgency is detected according to whether or not the snooze option has been selected. For example, if it is determined at 236 that the Snooze button 158 was used, the alerts module 53 may determine that it is appropriate to escalate the next alert at 226. The use of the Snooze button 158 may be indicative of the user being interested in receiving another alert and thus escalation is appropriate. If it is determined at 236 that the Snooze button 158 was not used, the alerts module 53 may then rely on the next parallel determination at 239 to decide whether outcome C is appropriate.

The alerts module 53 may also rely on external data 68 to determine at 238 if external events indicate an increased urgency associated with providing an alert and thus the next alert should be escalated, wherein the increased urgency is determined according to the presence or absence of a particular external event. For example, traffic or weather alerts can be used to activate a trigger for escalating the next alert. If it is determined at 239 that the urgency of the next alert has increased, the next alert can be escalated at 226. If it is determined at 239 that the urgency has not increased due to external events, the alerts module 53 in this example proceeds to outcome C, namely to determine that the next alert should not be escalated at 240.

It can be appreciated that the next alert can be provided at some fixed time (e.g. according to a snooze interval set by the user) or can be expedited according to various factors such as how many of the criteria are met, or a fixed interval from the previous alert regardless of user input.

Figure 12:
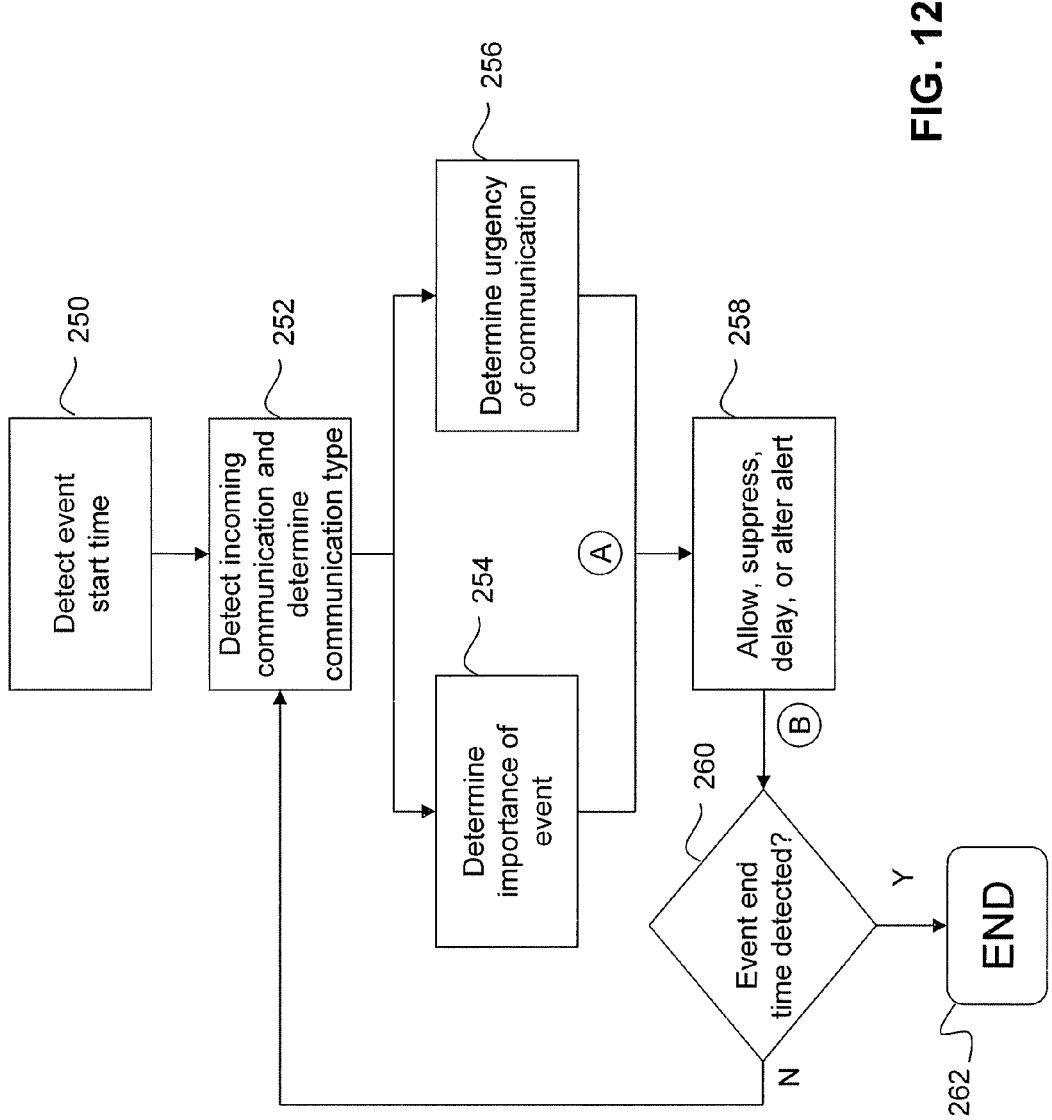
FIG. 12 is a flow chart comprising an example set of computer executable instructions for controlling the execution of an alert during an event.

The above examples enable the alerts module 53 to escalate alerts prior to a particular event in order to signify an increased urgency to the user. The alerts module 53 can also be used to control the delivery of alerts during the event. By controlling the delivery of alerts during the event, the alerts module 53 can suppress, allow, delay or alter alert notifications according to predetermined criteria. FIG. 12 illustrates an example set of computer executable instructions that may be executed by the alerts module 53 in order to control alert notifications associated with incoming communications.

At 250, the alerts module 53 detects the start time for a particular event. For example, the alerts module 53 may be notified by the events application 52 or another software component running on the mobile device 10. Detection of the start time for the event at 250 transitions the alerts module 53 into a "during event" mode wherein the alert notifications associated with incoming communications are controlled according to predetermined criteria. At 252, the alerts module 53 detects an incoming communication and determines its type, e.g. an incoming phone call, email, text message, instant message, social networking update, etc. The alerts module 53 then relies on predetermined criteria such as settings, preferences, IT policies, user input, etc., to determine the importance of the event at 254 and the urgency of the incoming communication at 256. As discussed earlier in connection with FIG. 5, the event can be marked as important when a new event entry 32 is generated which can be relied upon by the alerts module 53 in order to make the determination at 254. As also previously discussed, the importance of the event may be given various levels of granularity, for example High or Low; High, Medium, Low; level 1, level 2, level 3, level 4, etc.

The urgency of the communication determined at 256 can be evaluated according to the type of communication, the sending party, or according to out-of-band information such as an importance flag. For example, user preferences may dictate that incoming phone calls are generally blocked during an important event, except from a particular list of callers.

Similarly, important emails may trigger a notification that includes a vibration of the mobile device 10 but suppresses such notifications for emails marked as having normal importance. The alerts module 53 then uses an indication of the relative importance of the event and an indication of the relative urgency of the incoming communication to allow, suppress, delay, or alter the alert provided to the user at 258, and the process repeats for further incoming communications (if any) until the event end time is detected at 260. Once the event end time is detected at 260, the process ends at 262.

Figure 13:
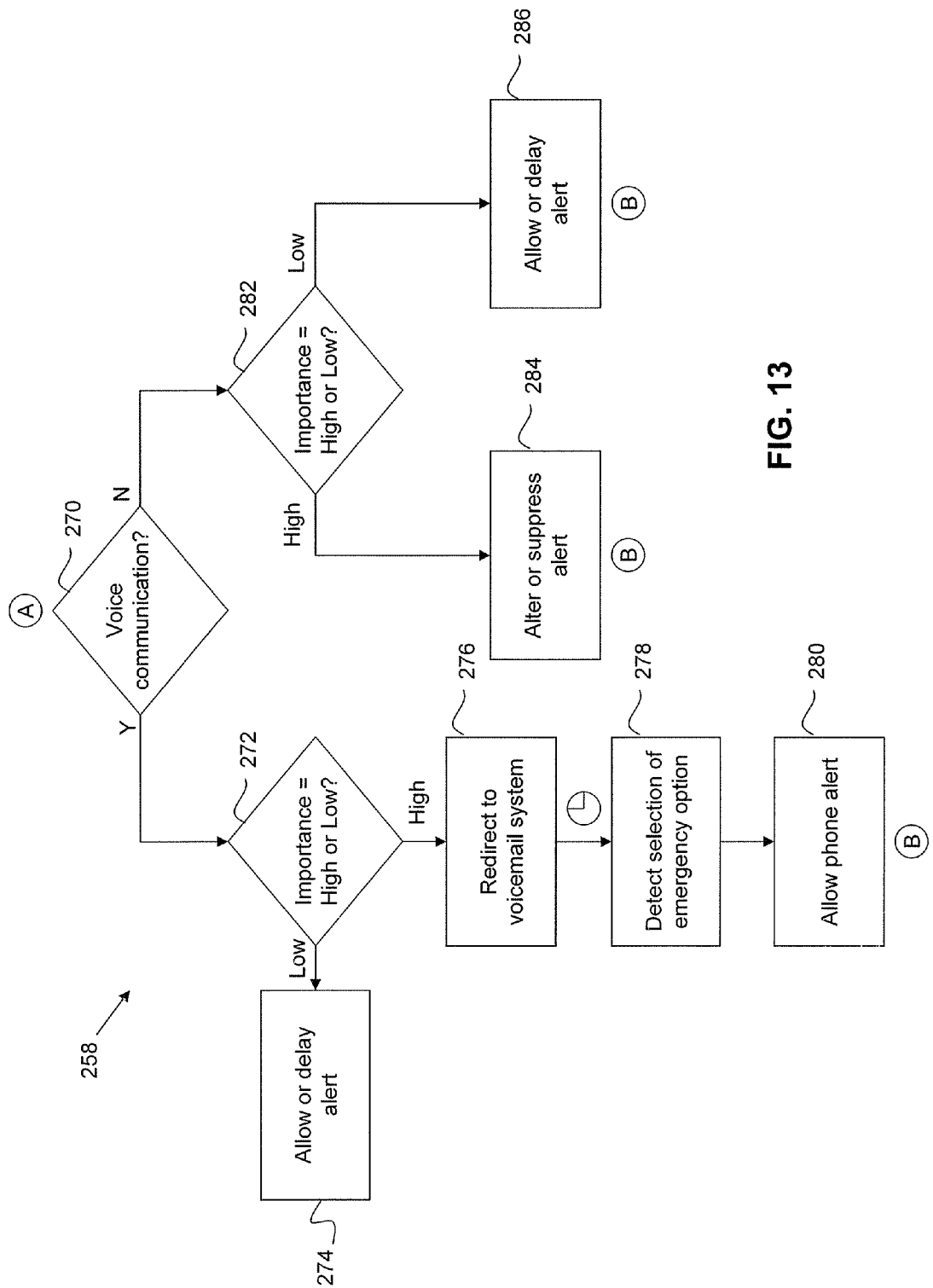
FIG. 13 is a flow chart comprising an example set of computer executable instructions for determining whether to allow, suppress, delay or alter an alert.

The determination made by the alerts module 53 at 258 can vary according to the communication type and various algorithms can be employed in order to distinguish between communication alert notifications that should be suppressed, allowed, delayed, or altered. FIG. 13 provides one example set of computer executable instructions for controlling event alert notifications during the event. In this example, the alerts module 53 determines at 270 whether or not the incoming communication is a voice communication, i.e. one that would likely require the user to reply by speaking, which can be considered more distracting than incoming text-based communications, and thus is dealt with separately in this example. If the incoming communication is not a voice communication, the alerts module 53 determines at 282, whether or not the importance of the event is high or low, e.g. based on whether or not the Mark As Important option 87 has been selected. If the importance of the event is determined to be high, the alert notification may be altered or suppressed at 284 to minimize distractions in these circumstances. Whether to alter or suppress the alert can be determined based on the urgency of the communication, e.g. by checking an out-of-band flag or based on the communication type. If the importance of the event is determined to be low, the alert notification may be allowed or delayed at 286. Whether to allow or delay the alert can also be determined based on the urgency of the communication. In this way, if the event is not important but the communication is deemed to be urgent, an alert notification such as a beep or vibration can be allowed. On the other hand, if the event importance is low and the urgency of the communication is low, the alert could be delayed, e.g. until the event is finished.

If the communication is a voice communication, the alerts module 53 also determines at 272, the relative importance of the event. If the event importance is low, the alert notification may be allowed or delayed at 274. Whether to allow or delay the alert can be determined based on the urgency of the communication such that urgent phone calls incoming during an event of low importance can be permitted. For events that are deemed to be relatively important at 272, the alerts module 53 can redirect incoming voice communications to an intermediary service such as a voicemail service at 276. The voicemail service can be configured to have an option allowing the caller to identify the call as being an emergency or as otherwise having an extremely high importance associated therewith. For example, when prompted to leave a voicemail message, an option can be provided to allow the caller to flag the call as an emergency thus allowing the call to be redirected back to the mobile device 10 with an out-of-band flag indicating that the call has been redirected and designated as an emergency. At this point, the alerts module 53 detects the selection of the emergency option at 278, e.g. by detecting the out-of-band flag, and allows the alert notification indicative of an incoming phone call to be provided at 280.

It can be appreciated from FIG. 13 that the alerts module 53 in this example relies on two criteria for determining whether to suppress, allow, alter or delay a notification, namely a detected relative importance associated with the event and a detected relative urgency associated with the incoming communication. Determinations made in operations 274, 284, and 286 may be made according to a decision matrix 300 such as that shown in FIG. 14 by way of example. In the example decision matrix 300, the relative communication urgency 302 is indicated by a plurality of columns and the relative event importance 304 is indicated by a plurality of rows. Applying this decision matrix 300 to FIG. 13, at 274, the event importance 304 is low and thus row two is used based on the communication urgency 302. If the communication has a high urgency, the alert is allowed and if the communication has a low urgency, the alert is delayed until after the event. At 284, the event importance 304 is high and thus row one is used based on the communication urgency 302. If the communication has a high urgency, the alert is altered, for example to flash but not beep or to provide a visual notification but not an audible or tactile notification. If the communication has a low urgency, the alert may instead be suppressed in order to minimize distractions in that circumstance. At 286, the event importance 304 is low and thus row two is used based on the communication urgency 302. If the communication has a high urgency, alert is allowed and if the communication has a low urgency, the alert is delayed, similar to at 274.

It can be appreciated that the decision matrix 300 shown in FIG. 14 is for illustrative purposes only and matrices of various sizes and complexities can be used. For example, if the event importance and communication urgency are given further granularity such as high, medium, and low, a 3×3 matrix would be used and further permutations used, based on the relative importance and urgencies detected.

Accordingly, there may be provided a method, computer readable medium, and computing device configured for controlling event reminders, wherein the method comprises the computing device enabling an event entry to be stored in the computing device, the event entry having a start time associated therewith; the computing device enabling a plurality of alerts to be provided at respective times prior to the start time; the computing device enabling one of a plurality of levels of notification to be associated with each of the plurality of alerts, wherein the plurality of levels are distinguishable from each other to enable the alerts to be escalated by changing the level associated with each subsequent alert; the computing device providing an initial alert prior to the start time, the initial alert comprising a first level of notification; the computing device detecting an increased urgency associated with the event entry subsequent to the initial alert; and the computing device providing a next alert prior to the start time, the next alert providing a second level of notification to thereby escalate the next alert with respect to the initial alert.

There may also be provided a method, computer readable medium, and computing device configured for controlling event reminders, wherein the method comprises the computing device enabling an event entry to be stored in the computing device, the event entry having a start time associated therewith; the computing device enabling a relative importance to be associated with the event; the computing device detecting an incoming communication having an alert notification and a relative urgency associated therewith; the computing device determining the relative importance of the event; the computing device determining the relative urgency of the incoming communication; and the computing device allowing, suppressing, delaying or altering the alert notification according to the determined importance of the event and the determined urgency of the incoming communication.

Although the above has been described with reference to certain specific embodiments, various modifications thereof will be apparent to those skilled in the art without departing from the scope of the claims appended hereto.

The invention claimed is:

1. A method of controlling event reminders in an electronic communication device, the method comprising:
the electronic communication device enabling an event entry to be stored in the computing device, the event entry having a start time associated therewith;
the electronic communication device enabling a plurality of alerts to be provided at respective times prior to the start time;
the electronic communication device enabling one of a plurality of levels of notification to be associated with each of the plurality of alerts, wherein the plurality of levels are distinguishable from each other to enable the alerts to be escalated by changing the level associated with each subsequent alert;
the electronic communication device providing an initial alert prior to the start time, the initial alert comprising a first level of notification;
the electronic communication device detecting an increased urgency associated with the event entry subsequent to the initial alert;
the electronic communication device providing a next alert prior to the start time, the next alert providing a second level of notification to thereby escalate the next alert with respect to the initial alert;
the electronic communication device detecting an increased urgency associated with the event entry subsequent to the next alert; and
the electronic communication device providing a third alert prior to the start time, the third alert providing a third level of notification to thereby escalate the third alert with respect to the next alert.

2. The method according to claim 1, further comprising:
the electronic communication device detecting a similar urgency associated with the event entry subsequent to the next alert; and
the electronic communication device providing the third alert prior to the start time, the third alert providing the first or second level of notification.

3. The method according to claim 1, wherein the initial alert comprising a snooze option to trigger the next alert, and wherein the increased urgency is detected according to whether or not the snooze option has been selected.

4. The method according to claim 1, further comprising the electronic communication device obtaining external data indicative of external events affecting the event, wherein the increased urgency is detected according to the presence or absence of a particular external event.

5. The method according to claim 4, wherein the particular external event related to any one or more of traffic information, and weather information.

6. The method according to claim 1, further comprising:
the electronic communication device determining a current time; and
the electronic communication device comparing the current time to the start time;
wherein the urgency is increased if the time remaining until the start time is less than a predetermined threshold.

7. The method according to claim 1, further comprising:
the electronic communication device determining a device location; and
the electronic communication device comparing the device location to an event location;
wherein the urgency is increased if the distance between the device location and the event location is greater than a predetermined threshold.

8. The method according to claim 7, wherein the electronic communication device is a mobile device, and wherein the device location is determined using GPS data obtained by the mobile device.

9. The method according to claim 1, wherein the plurality of levels of notification are distinguished from each other using combinations of any one or more of the following: a visual notification, an audible notification comprising one of a plurality of volume levels, and a tactile notification comprising movement of the electronic communication device.

10. A non-transitory computer readable medium comprising computer executable instructions for controlling event reminders in an electronic communication device, the computer readable medium comprising instructions for:
enabling an event entry to be stored in the computing device, the event entry having a start time associated therewith;
enabling a plurality of alerts to be provided at respective times prior to the start time;
enabling one of a plurality of levels of notification to be associated with each of the plurality of alerts, wherein the plurality of levels are distinguishable from each other to enable the alerts to be escalated by changing the level associated with each subsequent alert;
providing an initial alert prior to the start time, the initial alert comprising a first level of notification;
detecting an increased urgency associated with the event entry subsequent to the initial alert;
providing a next alert prior to the start time, the next alert providing a second level of notification to thereby escalate the next alert with respect to the initial alert;
detecting an increased urgency associated with the event entry subsequent to the next alert; and
providing a third alert prior to the start time, the third alert providing a third level of notification to thereby escalate the third alert with respect to the next alert.

11. An electronic communication device comprising a display, one or more input devices, and a processor configured to:
enable an event entry to be stored in the electronic communication device, the event entry having a start time associated therewith;
enable a plurality of alerts to be provided at respective times prior to the start time;
enable one of a plurality of levels of notification to be associated with each of the plurality of alerts, wherein the plurality of levels are distinguishable from each other to enable the alerts to be escalated by changing the level associated with each subsequent alert;
provide an initial alert prior to the start time, the initial alert comprising a first level of notification;
detect an increased urgency associated with the event entry subsequent to the initial alert;
provide a next alert prior to the start time, the next alert providing a second level of notification to thereby escalate the next alert with respect to the initial alert;
detect an increased urgency associated with the event entry subsequent to the next alert; and
provide a third alert prior to the start time, the third alert providing a third level of notification to thereby escalate the third alert with respect to the next alert.

12. The electronic communication device according to claim 11, further configured to:

detect a similar urgency associated with the event entry subsequent to the next alert; and provide the third alert prior to the start time, the third alert providing the first or second level of notification.

13. The electronic communication device according to claim 11, wherein the initial alert comprising a snooze option to trigger the next alert, and wherein the increased urgency is detected according to whether or not the snooze option has been selected.

14. The electronic communication device according to claim 11, further configured to obtain external data indicative of external events affecting the event, wherein the increased urgency is detected according to the presence or absence of a particular external event.

15. The electronic communication device according to claim 14, wherein the particular external event related to any one or more of traffic information, and weather information.

16. The electronic communication device according to claim 11, further configured to:
determine a current time; and
compare the current time to the start time;
wherein the urgency is increased if a time remaining until the start time is less than a predetermined threshold.

17. The electronic communication device according to claim 11, further configured to:
determine a device location; and
compare the device location to an event location;
wherein the urgency is increased if the distance between the device location and the event location is greater than a predetermined threshold.

18. The electronic communication device according to claim 17, wherein the electronic communication device is a mobile device, and wherein the device location is determined using GPS data obtained by the mobile device.

19. The electronic communication device according to claim 11, wherein the plurality of levels of notification are distinguished from each other using combinations of any one or more of the following: a visual notification, an audible notification comprising one of a plurality of volume levels, and a tactile notification comprising movement of the electronic communication device.

* * * * *